United States Patent Office  
3,652,606  
Patented Mar. 28, 1972

3,652,606  
3-OXYGENATED 11β-METHYLESTR-4-EN-17β-OL AND ESTERS THEREOF  
John S. Baran, Morton Grove, and Ivar Laos, Skokie, Ill., assignors to G. D. Searle & Co., Chicago, Ill.  
No Drawing. Filed Aug. 7, 1970, Ser. No. 62,195  
Int. Cl. C07c 169/20  
U.S. Cl. 260—397.5        2 Claims

ABSTRACT OF THE DISCLOSURE

Preparation of the captioned compounds and their valuable biological properties—including unexpectedly potent anabolic and androgenic activity—are disclosed.

---

This invention relates to 3-oxygenated 11β-methylestr-4-en-3β-ol, corresponding esters, and processes for the preparation thereof. More particularly, this invention provides new, useful, and unobvious chemical compounds of the formula

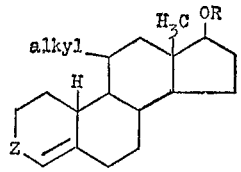

wherein R represents hydrogen or alkanoyl and Z represents carbonyl or a radical of the formula

in which RO is identical with RO in the first formula.

Among the alkyls comprehended in the foregoing formula, lower alkyls are preferred, which is to say methyl, ethyl, propyl, isopropyl, butyl, isobutyl, sec.-butyl, tert.-butyl, pentyl, neopentyl, hexyl, isohexyl, heptyl, and like monovalent, saturated, acyclic, straight- or branched-chain, hydrocarbon groupings of the formula

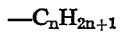

wherein $n$ represents a positive integer less than 8. The alkanoyl radicals comprehended by the formula are likewise most desirably of lower order, i.e., of the formula

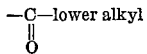

wherein the lower alkyl constituent is defined as before.

The compounds to which this invention relates are useful by reason of their valuable biological properties. Thus, for example, they are androgenic, anabolic, anti-bacterial, and anti-fungal. Their oral androgenic and anabolic potency is especially surprising when compared with that of corresponding compounds lacking the 11β-methyl, since the latter substituent has not heretofore been known to enhance these properties (as distinguished, for example, from estrogenic activity).

The androgenic utility of the instant compounds is evident from the results of a standardized test for their capacity to stimulate the growth of seminal vesicle and ventral prostate glands in castrated immature male rates. The procedure is essentially that described by Saunders and Drill, Proc. Soc. Exp. Biol. Med., 94, 646 (1957). Male Sprague-Dawley rats are castrated at 22–24 days of age; and to each of a group of 5 or more such animals beginning 19–21 days later, the compound to be tested, dissolved or suspended in corn oil or other physiologically inert vehicle, is administered intramuscularly or intragastrically in equally divided doses on each of 7 successive days. Commonly, the initial total dose is 5 mg. of compound in 0.7 ml. of corn oil administered intramuscularly or 15 mg. of compound in 1.4 ml. of corn oil administered intragastrically. A second group of 5 or more animals likewise and concurrently administered corn oil alone serves as controls. On the day after treatment is concluded, the animals are sacrificed; and the seminal vesicle and ventral prostate glands are excised and dissected free of extraneous tissue. Fluid is expressed from the vesicles (but not the prostates), whereupon the glands are blotted and weighed. A compound is considered androgenic if the mean weight of the vesicles in the group of animals treated therewith is significantly ($P \leq 0.01$) greater than the corresponding weight in the control group and there is a proportionate increase in the mean prostate weight for treats vis-a-vis controls. Intramuscular potency of the compounds, relative to testosterone propionate, is determined by repeating the test at progressively diminishing doses until the minimum effective dose is found, dividing this dose by the minimum effective dose of testosterone propionate in the same test, and multiplying the quotient by 100. Intragastric potency, relative to 17-methyltestosterone, is determined by dividing a dose at which the compound is found to be androgenic by that dose of 17-methyltestosterone sufficient to produce an identical response in the same test, and multiplying the quotient by 100.

The anabolic utility of the instant compounds is evident from the results of a standardized test identical with that described above for the determination of androgenic activity except that an increase in weight of levator ani muscles of the test animals is used as the index of activity.

The anti-bacterial utility of the instant compounds is evident from the results of a standardized test for the capacity to prevent the growth of Erwina sp. In this test, nutrient broth (manufactured by Baltimore Biological Laboratories or Difco) is prepared at twice the concentration recommended by the manufacturer, sterilized, and inoculated with 2% (by volume) of a culture of the test organism. Meanwhile, compound is heated in sterile distilled water at a concentration of 2000γ per ml. and a temperature of 80° C. for 20 min. An equivolume mixture of this compound preparation and the inoculated broth is incubated aerobically at 37° C. for 24–48 hr. and then examined grossly for growth of the test organism. If growth is observed, the compound is considered inactive. If no such growth is observed, the incubated mixture is serially diluted and mixed with an inoculated broth of the same composition as before excepting that the concentration is halved and 1% (by volume) of the culture instead of 2% is incorporated. Amounts of the latter broth added are such that concentrations of 100, 10 and 1γ of compound per ml. result. Mixtures thus obtained are incubated as before and then examined grossly for growth of the test organism. Potency is expressed as the minimum concentration at which no growth of test organism is discernible. Controls are provided by concurrent incubations identical with the foregoing except for the absence of compound.

The anti-fungal utility of the instant compounds is evident from the results of standardized tests for their capacity to prevent the growth of Trichophyton mentagrophytes and Verticillium albo-atrum. In these tests, two concentrations of Sabouraud dextrose agar (manufactured by Baltimore Biological Laboratories or Difco) are prepared, one as recommended by the manufacturer and the other at twice this concentration. These preparations are sterilized and then maintained in a fluid state at 80° C. Meanwhile, compound is heated in sterile distilled water at a concentration of 1000γ per ml. and a temperature of 80° C. for 20 min. An equivolume mixture of this compound preparation and the double-strength agar is serially diluted and mixed with the single strength agar in amounts such that concentrations of 1000, 100, 10 and 1γ of test compound per ml. result. The mixtures thus obtained are allowed to cool and solidify, whereupon they are surface-inoculated with a suspension of *T. mentagrophytes* or *V. albo-atrum* and then incubated aerobically at room temperatures. The incubation period is 6–7 days for *T. mentagrophytes* and 5–7 days for *V. albo-atrum*. Activity is determined by gross examination, and the potency is expressed as the minimum concentration at which no growth of the test organism is discernible. Controls are provided by concurrent incubations identical with the foregoing except for the absence of compound.

Preparation of the subject compounds proceeds by Birch reduction of an 11β-alkyl-3-methoxyestr-1,3,5(10)-trien-17β-ol (U.S. 3,377,365) to the corresponding 11β-alkyl-3-methoxyestr-2,5(10)-dien-17β - ol, hydrolytically rearranging this enol ether to the corresponding 4-en-3-one with methanolic hydrochloric acid, reducing the 3-one with lithium hydrotri-tert.-butoxyaluminate in tetrahydrofuran, and esterifying the resultant diol with an alkanoic acid anhydride or halide in the presence of an acid acceptor such as pyridine.

The following examples describe in detail compounds illustrative of the present invention and methods which have been devised for their preparation. It will be apparent to those skilled in the art that many modifications, both of materials and of methods, may be practiced without departing from the purpose and intent of this disclosure. Throughout the examples hereinafter set forth, temperatures are given in degrees centigrade and relative amounts of materials in parts by weight, except as otherwise noted.

EXAMPLE 1

(A) 3 - methoxy - 11β - methylestra - 2,5(10) - dien-17β-ol.—To approximately 4100 parts of liquid ammonia is added, with stirring during 15 minutes, a solution of 213 parts of 3-methoxy-11β-methylestra-1,3,5(10)-trien-17β-ol in a mixture of 1780 parts of tetrahydrofuran and 1560 parts of tert.-butyl alcohol, followed by 346 parts of sodium cut into small chunks. Stirring is continued for 2 hours, whereupon the blue color is discharged by slowly introducing 240 parts of methanol during 15 minutes. Ammonia is then evaporated by a stream of nitrogen, approximately 3000 parts of water is added, and the resultant mixture is stripped of organic solvents by vacuum distillation. The distilland is filtered and the insoluble solids thus isolated washed well with water. The product so obtained is 3-methoxy-11β-methylestra-2,5(10)-dien-17β-ol.

(B) 17β-hydroxy-11β-methylestr-4-en-3-one.—To a solution of 10 parts of 3-methoxy-11β-methylestra-2,5(10)-dien-17β-ol in 150 parts of methanol is added 7 parts of concentrated hydrochloric acid diluted with 12 parts of water. The resultant mixture is heated at the boiling point under reflux in a nitrogen atmosphere for 1 hour, then cooled and neutralized with aqueous 5% sodium bicarbonate. Methanol is removed from the mixture thus obtained by vacuum distillation, and the residue is extracted with ethyl acetate. The ethyl acetate extract is washed twice with water, dried over anhydrous sodium sulfate, and concentrated by distillation to the point of incipient precipitation. After chilling, the 17β-hydroxy-11β-methylestr-4-en-3-one thrown down is isolated by filtration and dried in air. It melts at 163–166° and has the formula

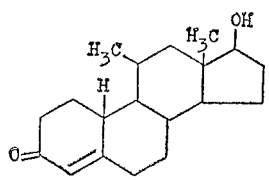

EXAMPLE 2

11β-ethyl-17β-hydroxyestr-4-en-3-one.—Substitution of 223 parts of 11β-ethyl-3-methoxyestra-1,3,5(10)-trien-17β-ol for the 3-methoxy-11β-methylestra-1,3,5(10)-trien-17β-ol called for in Part A of Example 1 affords, by the procedure detailed there and in Part B of the example, 11β-ethyl-17β-hydroxyestr-4-en-3-one. The product has the formula

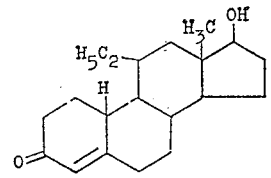

EXAMPLE 3

11β-methylestr-4-ene-3β,17β-diol.—To a solution of 3 parts of 17β-hydroxy-11β-methylestr-4-en-3-one in 36 parts of tetrahydrofuran sufficiently cooled to counteract any exothermic effect is added 5 parts of lithium hydrotri-tert.-butoxyaluminate. The resultant mixture is stirred at room temperatures for 1½ hours during which moisture is excluded, then poured into 200 parts of a mixture of ice and water containing 10 parts of acetic acid. The mixture thus obtained is extracted with dichloromethane. The extract is washed well with water and then with aqueous 5% sodium bicarbonate, whereupon it is dried over sodium sulfate and finally stripped of solvent by vacuum distillation. The residue is 11β-methylestr-4-ene-3β,17β-diol, having the formula

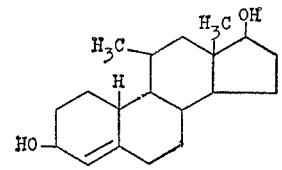

EXAMPLE 4

3β,17β-diacetoxy-11β-methylestr-4-ene.—A mixture of 5 parts of 11β-methylestr-3-ene-3β,17β-diol, 46 parts of acetic acid anhydride, and 34 parts of pyridine is allowed to stand at room temperatures overnight, then stirred into 600 parts of a mixture of ice and water. The mixture thus obtained is extracted with dichloromethane. The dichloromethane extract is washed with water, dried over sodium sulfate, and stripped of solvent by vacuum distillation. The residue is chromatographed on neutral alumina, using benzene and mixtures thereof with increasing amounts of ethyl acetate as developing solvents. From an eluate comprising 30% ethyl acetate in benzene, on evaporation of solvent and recrystallization of the residue from a mixture of acetone and hexane, 3β,17β-diacetoxy-11β-methylestr-4-ene melting at 118–120° is obtained. The product has the formula

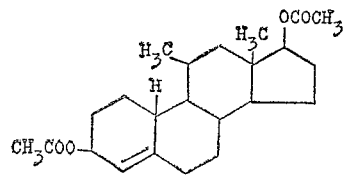

EXAMPLE 5

11β - methyl-3β,17β-dibutyryloxyestr-4-ene.—Substitution of 40 parts of butyric anhydride for the acetic anhydride called for in Example 4 affords, by the procedure there detailed, 11β-methyl-3β,17β-dibutyryloxyester-4-ene, having the formula

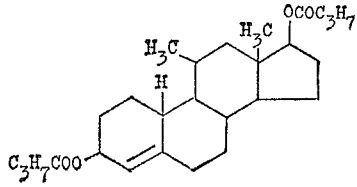

What is claimed is:
1. A compound of the formula

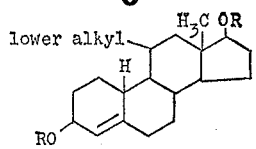

wherein R represents hydrogen or lower alkanoyl.

2. A compound according to claim 1 which is 3β, 17β-diacetoxy-11β-methylestr-4-ene.

References Cited
UNITED STATES PATENTS

| | | | |
|---|---|---|---|
| 2,843,608 | 7/1958 | Colton | 260—397.5 |
| 3,325,520 | 6/1967 | Baran | 260—397.45 |

HENRY A. FRENCH, Primary Examiner

U.S. Cl. X.R.

260—397.45; 424—238

UNITED STATES PATENT OFFICE
CERTIFICATE OF CORRECTION

Patent No. 3,652,606      Dated March 28, 1972

Inventor(s) John S. Baran and Ivar Laos

It is certified that error appears in the above-identified patent and that said Letters Patent are hereby corrected as shown below:

Column 2, line 69, "1000 $\gamma$" should be -- 2000 $\gamma$ --.

Column 4, line 51, "3-ene-" should be -- 4-ene- --.

Signed and sealed this 1st day of August 1972.

(SEAL)
Attest:

EDWARD M. FLETCHER, JR.       ROBERT GOTTSCHALK
Attesting Officer      Commissioner of Patents